(12) United States Patent
Zheng et al.

(10) Patent No.: US 11,974,595 B2
(45) Date of Patent: May 7, 2024

(54) METHOD FOR TESTING BURNING PERFORMANCE OF DARK-COLORED CIGARETTE USING DARK-COLORED CIGARETTE PAPER

(71) Applicant: CHINA TOBACCO YUNNAN INDUSTRIAL CO., LTD, Kunming (CN)

(72) Inventors: Han Zheng, Kunming (CN); Jianbo Zhan, Kunming (CN); Hao Wang, Kunming (CN); Zhenhua Yu, Kunming (CN); Jiao Xie, Kunming (CN); Xu Wang, Kunming (CN); Ying Zhang, Kunming (CN); Tao Wang, Kunming (CN); Baoshan Yue, Kunming (CN); Tingting Yu, Kunming (CN); Jiang Yu, Kunming (CN); Liwei Li, Kunming (CN); Jing Zhang, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 18/548,102

(22) PCT Filed: Sep. 20, 2022

(86) PCT No.: PCT/CN2022/119890
§ 371 (c)(1),
(2) Date: Aug. 28, 2023

(65) Prior Publication Data
US 2024/0081390 A1    Mar. 14, 2024

(30) Foreign Application Priority Data
Sep. 13, 2022   (CN) .............................. 202211111827

(51) Int. Cl.
*G06K 9/00*   (2022.01)
*A24C 5/34*   (2006.01)
(Continued)

(52) U.S. Cl.
CPC .............. *A24C 5/3406* (2013.01); *A24D 1/02* (2013.01); *G06T 7/0002* (2013.01); *G06T 7/13* (2017.01);
(Continued)

(58) Field of Classification Search
CPC ......... A24C 5/3406; G06T 7/136; G06T 7/73; G06T 7/13; G06T 7/0002; H04N 23/50; A24D 1/02; B25J 11/00
(Continued)

(56) References Cited

U.S. PATENT DOCUMENTS

2011/0050879 A1    3/2011   Shyy

FOREIGN PATENT DOCUMENTS

| CN | 103512888 A | 1/2014 |
| CN | 106152965 A | 11/2016 |

(Continued)

OTHER PUBLICATIONS

Zheng, Han, et al. "Study on grey benchmark adjustment and visual measurement of cigarette combustion." Journal of Physics: Conference Series. vol. 2044. No. 1. IOP Publishing, 2021. (Year: 2021).*
(Continued)

*Primary Examiner* — Jonathan S Lee
(74) *Attorney, Agent, or Firm* — Bayramoglu Law Offices LLC

(57) ABSTRACT

A method for testing burning performance of a dark-colored cigarette using a dark-colored cigarette paper is provided. The dark-colored cigarette paper has a grayscale less than 255. The method includes: simulating, by a robotic arm, a cigarette smoking process and environment; acquiring, by a
(Continued)

full-vision camera system, an image of a burn line and ash column region of the dark-colored cigarette; and analyzing a burning performance indicator of the dark-colored cigarette according to coordinate information of the burn line and ash column region. The method is based on a surface reflection characteristic of the dark-colored cigarette paper and a principle of optical reflection to light and highlight an edge of the dark-colored cigarette sample by a light source at a certain angle from a side. In this way, the method forms a chromatic aberration to localize the dark-colored cigarette sample, thereby testing the burning performance of the dark-colored cigarette sample.

8 Claims, 9 Drawing Sheets
(8 of 9 Drawing Sheet(s) Filed in Color)

(51) Int. Cl.
*A24D 1/02* (2006.01)
*G06T 7/00* (2017.01)
*G06T 7/13* (2017.01)
*G06T 7/136* (2017.01)
*G06T 7/73* (2017.01)
*H04N 23/50* (2023.01)
*B25J 11/00* (2006.01)

(52) U.S. Cl.
CPC ............... *G06T 7/136* (2017.01); *G06T 7/73* (2017.01); *H04N 23/50* (2023.01); *B25J 11/00* (2013.01)

(58) Field of Classification Search
USPC ........................................ 382/141
See application file for complete search history.

(56) References Cited

FOREIGN PATENT DOCUMENTS

| | | |
|---|---|---|
| CN | 111426788 A | 7/2020 |
| CN | 111426789 A | 7/2020 |
| CN | 111426794 A | 7/2020 |
| CN | 111426795 A | 7/2020 |
| CN | 111521726 A | 8/2020 |
| CN | 111830047 A | 10/2020 |
| CN | 112085806 A | 12/2020 |
| CN | 113156047 A | 7/2021 |
| CN | 113671105 A | 11/2021 |

OTHER PUBLICATIONS

Zheng, Han, et al. "Research on measurement method of cigarette combustion carbon line uniformity based on full vision." International Conference on Optoelectronic Materials and Devices (ICOMD 2021). vol. 12164. SPIE, 2022. (Year: 2022).*

Zheng, Han, et al. "Measurement of cigarette combustion ash line width on the basis of full vision." International Conference on Optoelectronic Materials and Devices (ICOMD 2021). vol. 12164. SPIE, 2022. (Year: 2022).*

Wang, Xiaofeng, et al. "A comparative study on the physicochemical properties of tobacco ash from lit bright cigarettes with different cut tobacco fillers." Journal of Analytical and Applied Pyrolysis 168 (2022): 105704. (Year: 2022).*

Zheng, Han, et al. "Effect of Different Puff Modes on Ash Condensation Performance of Cigarettes." Journal of Physics: Conference Series. vol. 1676. No. 1. IOP Publishing, 2020. (Year: 2020).*

GB/T 16447-2004, Tobacco and tobacco products-Atmosphere for conditioning and testing, China National Standards, 2004, pp. 1-2, General Administration of Quality Supervision, Inspection and Quarantine of the People's Republic of China; Standardization Administration of the People's Republic of China.

* cited by examiner

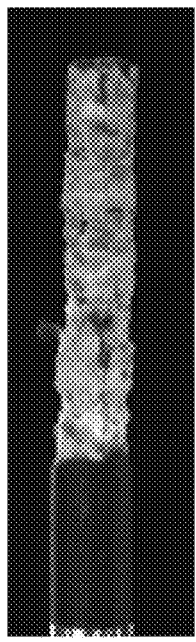 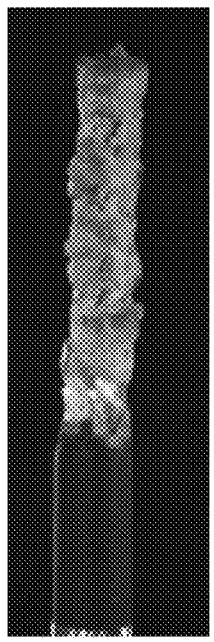 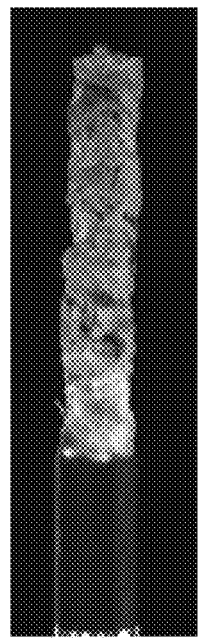 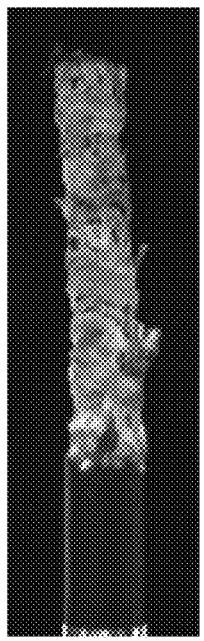 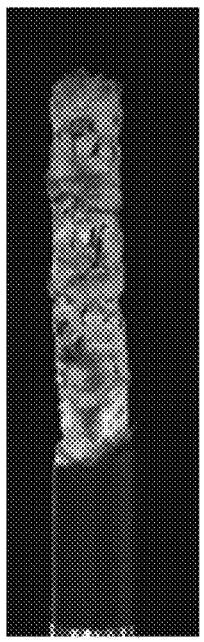
FIG. 7A  FIG. 7B  FIG. 7C  FIG. 7D  FIG. 7E
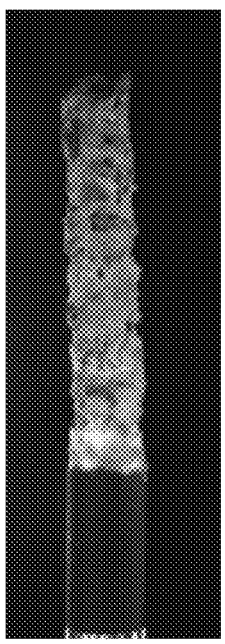 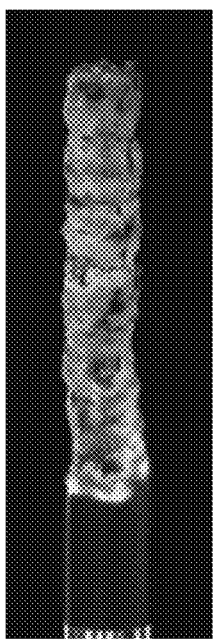 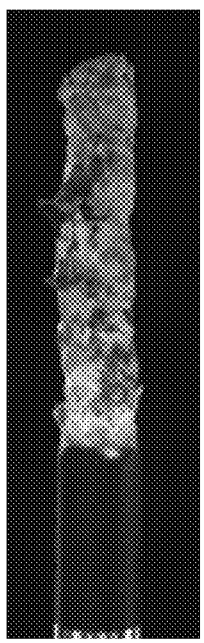 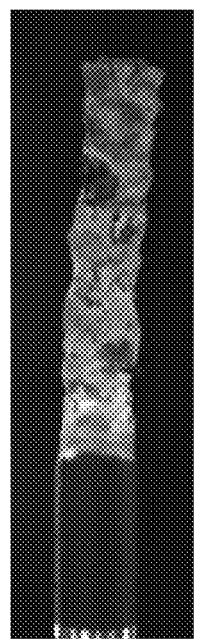 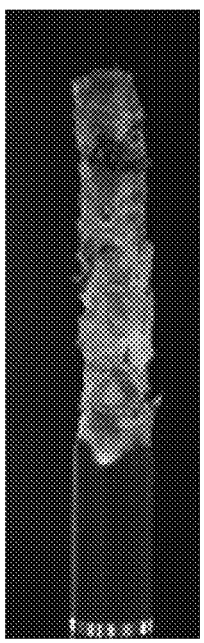
FIG. 7F  FIG. 7G  FIG. 7H  FIG. 7I  FIG. 7J

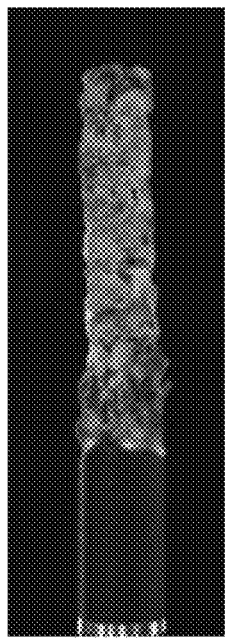 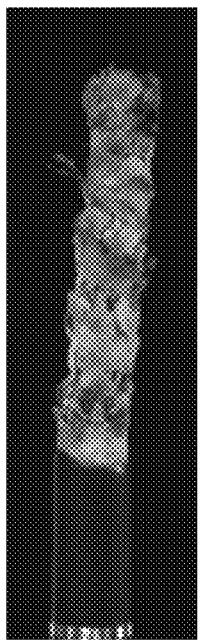 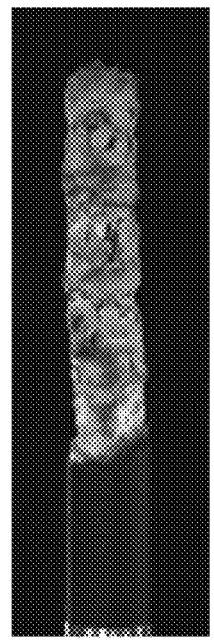 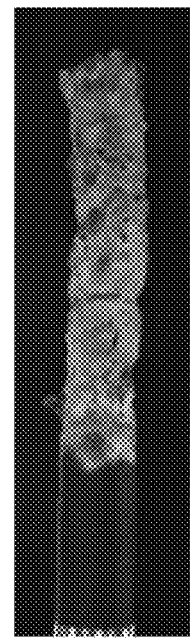 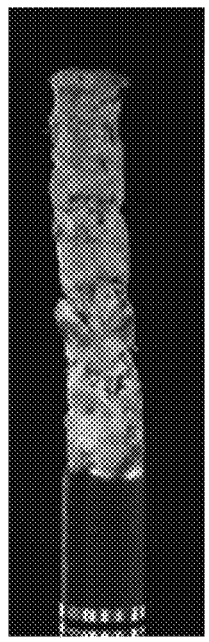
FIG. 8A    FIG. 8B    FIG. 8C    FIG. 8D    FIG. 8E
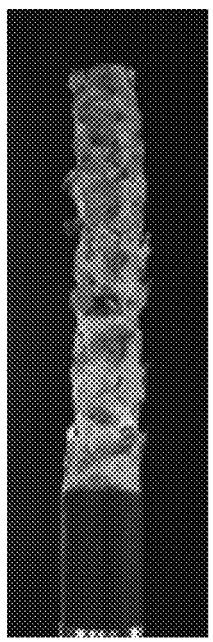 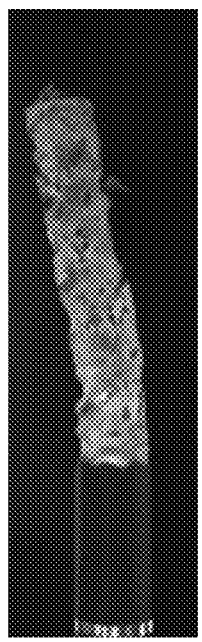 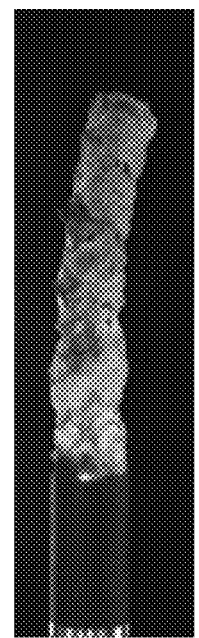 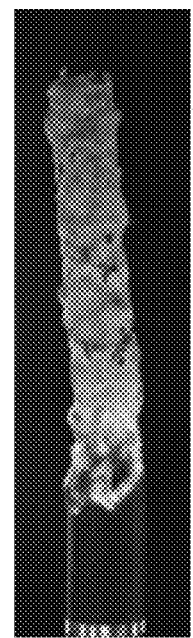 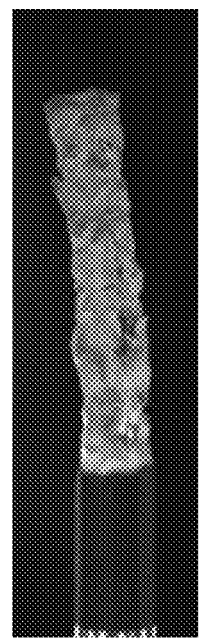
FIG. 8F    FIG. 8G    FIG. 8H    FIG. 8I    FIG. 8J

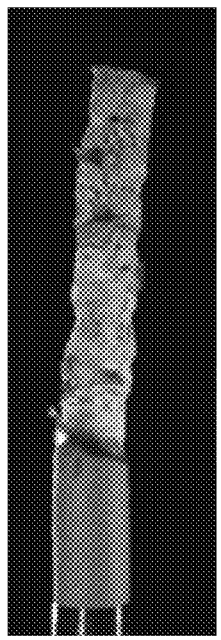 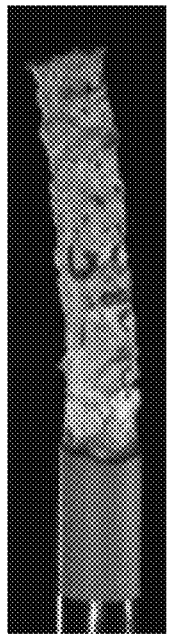 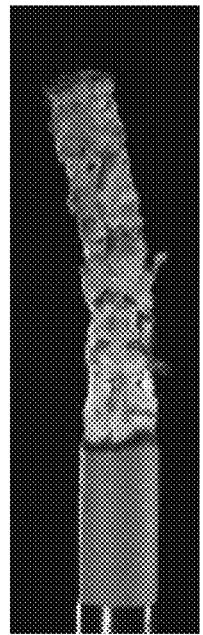 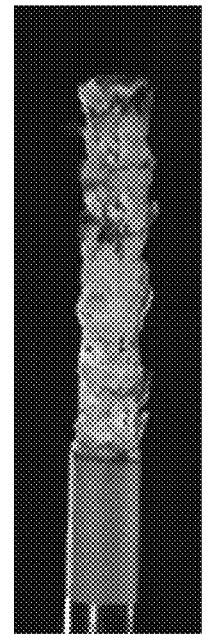 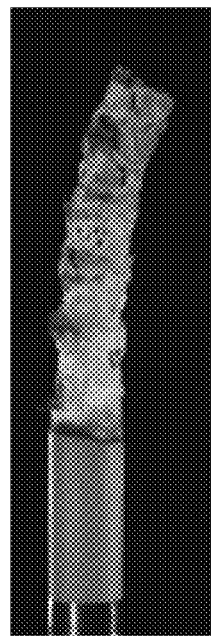
FIG. 9A    FIG. 9B    FIG. 9C    FIG. 9D    FIG. 9E
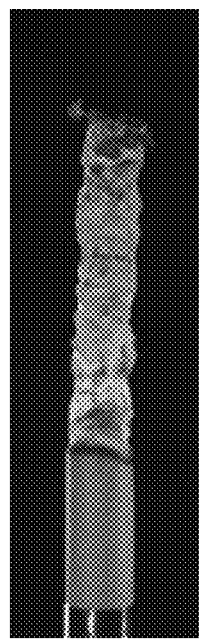 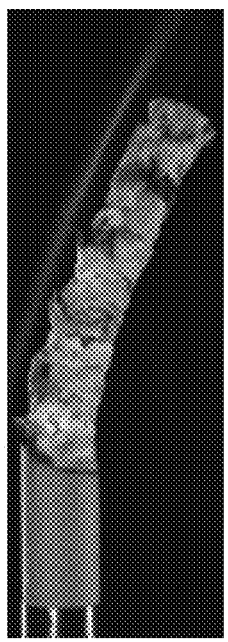 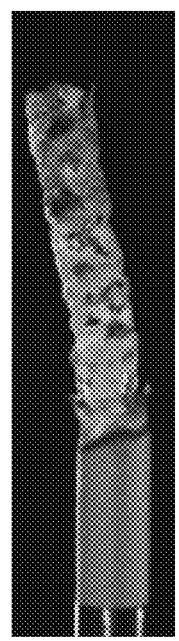 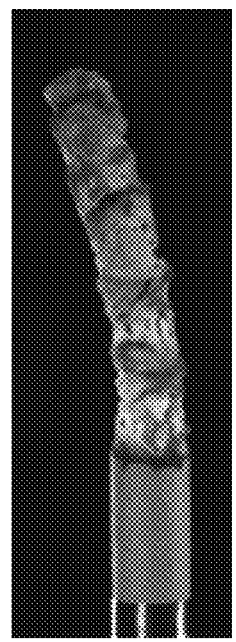 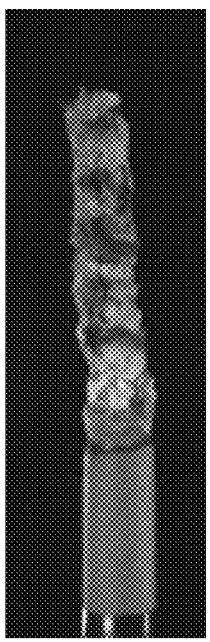
FIG. 9F    FIG. 9G    FIG. 9H    FIG. 9I    FIG. 9J

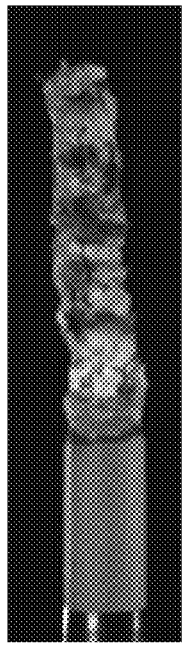 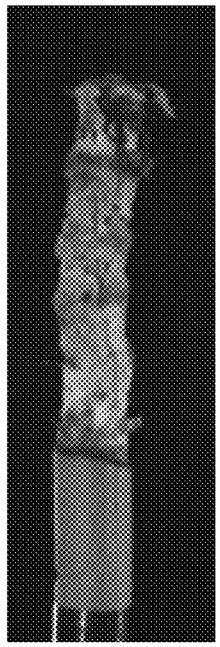 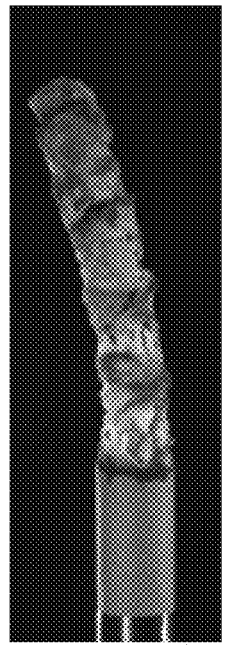 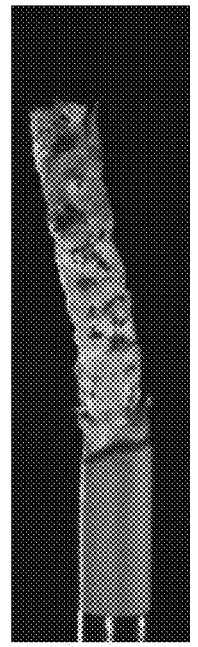 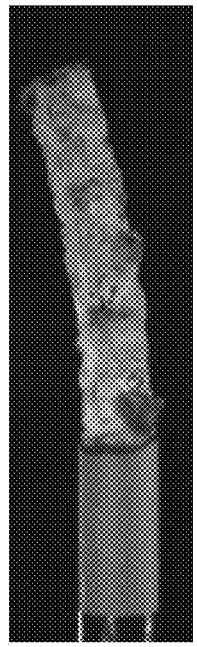
FIG. 10A　　FIG. 10B　　FIG. 10C　　FIG. 10D　　FIG. 10E
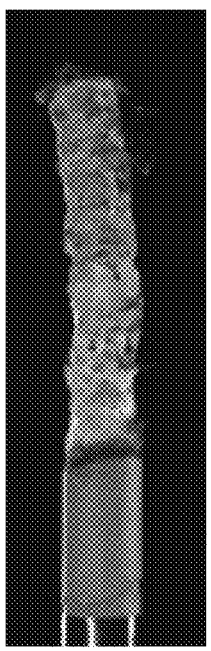 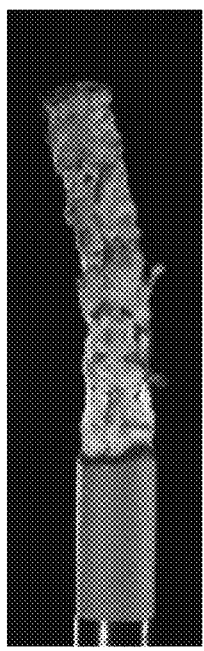 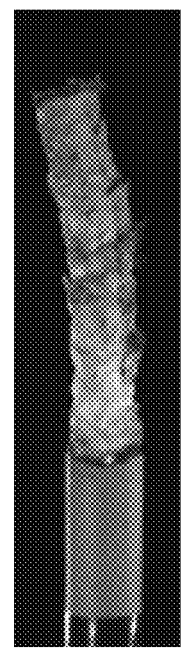 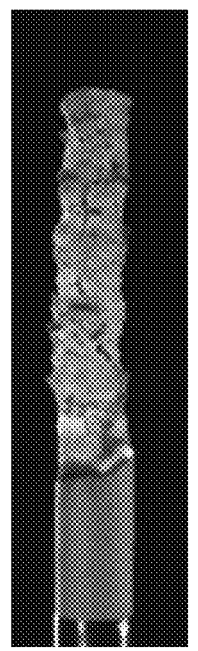 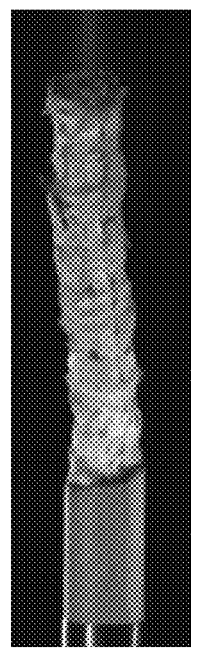
FIG. 10F　　FIG. 10G　　FIG. 10H　　FIG. 10I　　FIG. 10J

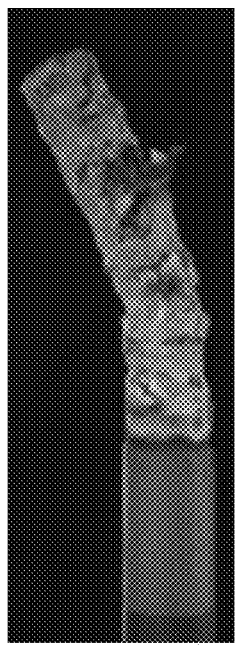 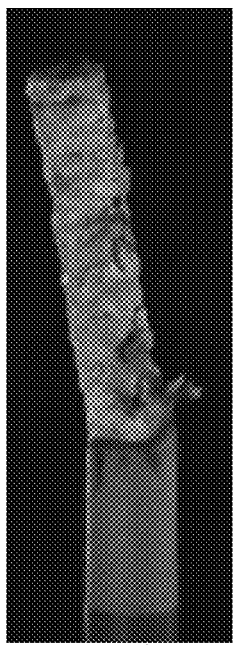 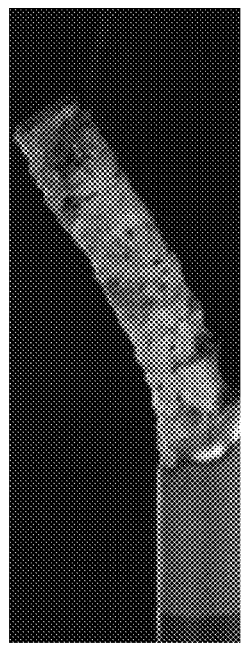 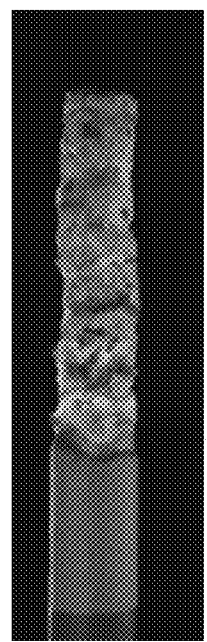 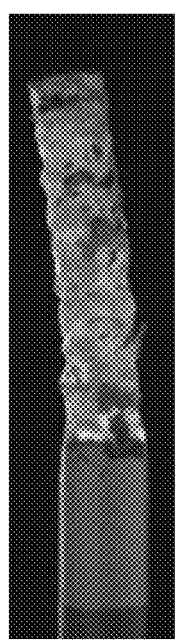
FIG. 12A  FIG. 12B  FIG. 12C  FIG. 12D  FIG. 12E
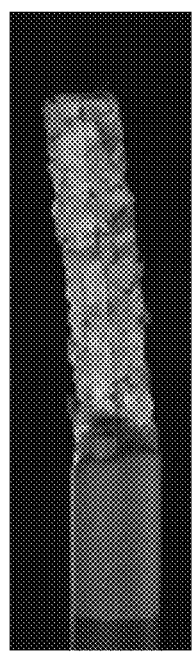 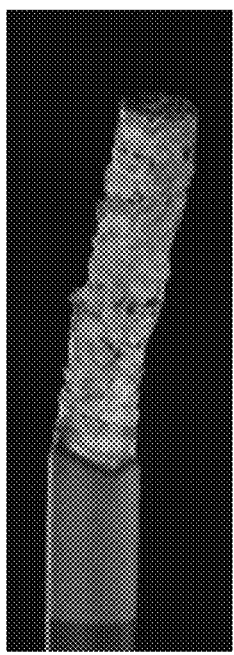 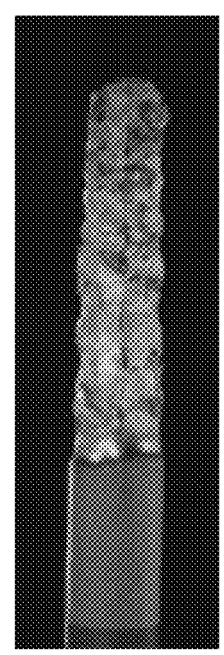 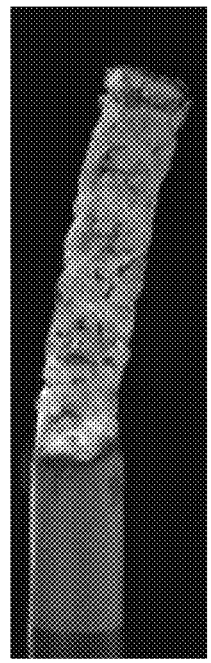 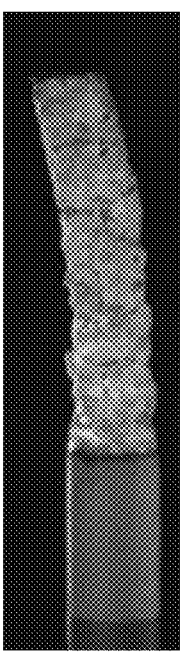
FIG. 12F  FIG. 12G  FIG. 12H  FIG. 12I  FIG. 12J

METHOD FOR TESTING BURNING PERFORMANCE OF DARK-COLORED CIGARETTE USING DARK-COLORED CIGARETTE PAPER

CROSS REFERENCE TO THE RELATED APPLICATIONS

This application is the national phase entry of International Application No. PCT/CN2022/119890, filed on Sep. 20, 2022, which is based upon and claims priority to Chinese Patent Application No. 202211111827.0, filed on Sep. 13, 2022, the entire contents of which are incorporated herein by reference.

TECHNICAL FIELD

The present disclosure belongs to the field of cigarette burning performance, and in particular relates to a method for testing burning performance of a dark-colored cigarette using a dark-colored cigarette paper.

BACKGROUND

Burning performance indicators of cigarettes characterize the burning state of cigarettes in the smoking process, and usually include: crack rate, burn line quality, grayness, and fly ash that are related to consumer smoking experience. Consumers are putting forward increasingly high requirements on the quality of cigarettes. Therefore, it is necessary to conduct targeted research on burning performance indicators based on a consumer smoking experience, so as to guide and adjust the formula of raw materials and accessories of cigarettes, and thereby improve cigarette quality.

In the past, these burning performance indicators were subjectively evaluated by visual methods. The evaluation was easily influenced by the technical level, experience, and subjective consciousness of the observer, thereby affecting the accuracy and objectivity of the resulting evaluation. Meanwhile, real-time burning data of cigarettes could not be acquired through the visual method, thereby affecting data-based scientific statistics and research. At present, in order to solve the above problems, machine vision is mainly employed for image acquisition and quantitative analysis. In the process of image acquisition, in order to achieve accurate acquisition and real-time analysis of the image of the burned lengthwise part of the cigarette, the burn line is taken as a basis for localization and image acquisition. Due to the widespread use of white cigarette paper in conventional cigarettes, in order to avoid significant test errors caused by the impact of the environment on the acquired image, the environmental background is usually set in a dark color, typically black.

With the globalization of the consumer market, the quality of consumption is constantly improving, and the consumer demand is diversified. Cigarettes have gradually emerged as colored cigarettes, in addition to traditional white cigarettes. Currently, the colored cigarettes on the market are mainly dark-colored cigarettes, with common ones such as brown and black cigarettes, and cigarettes in the same color can be further divided into different subclasses based on different intensities of the color. For conventional white cigarettes (using white cigarette paper), the image processing step is performed by a visual detection method based on a chromatic aberration between the cigarette paper and the environmental background (usually black). This method can achieve localization and detection of the cigarette within the field of view. However, for commercially available dark-colored cigarettes (such as black, dark brown, and light brown cigarettes), it is hard to form an effective chromatic aberration between the dark-colored cigarette paper and a dark environmental background during image processing. As a result, the edge of a dark-colored cigarette cannot be distinguished in the image acquired by the camera system, making it hard to localize the cigarette through a chromatic aberration. Therefore, there is currently a lack of a method and instrument for testing the burning performance of a dark-colored cigarette.

For this reason, the present disclosure is proposed.

SUMMARY

An objective of the present disclosure is to provide a method for testing burning performance of a dark-colored cigarette using a dark-colored cigarette paper. The method includes: adjusting a lighting system; acquiring, by a camera system, an image of a burn line of the dark-colored cigarette; and determining the burning performance of the dark-colored cigarette based on the burn line. The lighting system includes a plurality of parallel light sources. Positions of the lighting source and cameras are adjusted to highlight reflected light on an edge of the dark-colored cigarette. The camera system includes a plurality of industrial cameras. Through exposure control on the industrial cameras, the industrial cameras can distinguish the highlighted edge of the dark-colored cigarette from a background of a dark field during image processing, so as to acquire an edge peak of a chromatic aberration. A scanning line of a detection algorithm is employed to capture the edge peak, so as to track and localize the dark-colored cigarette in a field of view in real time, thereby tracking and localizing the burn line of the dark-colored cigarette in real time. The present disclosure fills in the blank of a method and instrument for testing the burning performance of a dark-colored cigarette using a dark-colored cigarette paper. In the prior art, it is hard to distinguish between the dark-colored cigarette paper and the dark burn line in the image captured by the camera system, thereby failing to localize the edge of the dark-colored cigarette and the burn line.

The burning performance indicators of cigarettes usually include a crack rate, a deviation degree of an ash column, a grayscale of the ash column, a length of the ash column, an area of the ash column, an ash shrinkage rate, a fly ash value, an ash holding rate, a width of the burn line, a uniformity of the burn line, and a burning rate. These burning performance indicators are described as follows. The crack rate refers to a proportion of an area of ash flakes falling or cracking on the ash column to an overall surface area of the ash column. The deviation degree of the ash column refers to a maximum deviation angle between the ash column and an axis of a filter rod. The grayscale of the ash column reflects a relative color difference of a remaining part of the ash column except a crack part under a same reference. A larger grayscale indicates a whiter ash column. The length of the ash column refers to the length of the ash column formed after the cigarette is burned. The area of the ash column refers to a width of the ash column formed after the cigarette is burned. The ash shrinkage rate refers to a ratio of the area of the ash column formed after the cigarette is burned to an area of the cigarette before the cigarette is burned. The fly ash value refers to an area of ash scattered outside a designated flick point. The ash holding rate refers to a ratio of a maximum length of the ash column maintained during a burning process to a burning length reaching a cigarette end. The width of the burn line refers to the width of the burn line at a bottom of a cigarette burning cone. The uniformity of the burn line refers to an extreme difference between a highest point and a lowest point of the burn line at the bottom of the cigarette burning cone. The burning rate refers to a ratio of a burning length to a burning time.

Specifically, the present disclosure is implemented through the following technical solution.

The present disclosure provides a method for testing burning performance of a dark-colored cigarette using a dark-colored cigarette paper. The dark-colored cigarette paper of the dark-colored cigarette has a grayscale less than 255. Preferably, the dark-colored cigarette paper is a cigarette paper with a grayscale less than 200. More preferably, the dark-colored cigarette paper is a cigarette paper with a grayscale less than 180. In the present disclosure, a cigarette using a non-white cigarette paper is referred to as a dark-colored cigarette. Preferably, the dark-colored cigarette refers to a cigarette using a commonly used black, dark brown, light brown, and multi-colored cigarette paper in the market. In the present disclosure, the grayscale represents a color depth of the cigarette paper between black and white, ranging from 0 to 255. 255 denotes the grayscale of a white cigarette paper, while 0 denotes the grayscale of a black cigarette paper. A smaller grayscale indicates a darker color.

This method includes: simulating, by a robotic arm, a cigarette smoking process and environment; acquiring, by a full-vision camera system, an image of a burn line and ash column region of the dark-colored cigarette; and analyzing a burning performance indicator of the dark-colored cigarette according to coordinate information of the burn line and ash column region.

Specifically, this method includes the following steps:

1) conducting pre-treatment on a dark-colored cigarette sample in accordance with GB/T 16447 standard before a test begins;

2) putting the dark-colored cigarette sample at a testing position, where an axial direction of the dark-colored cigarette sample at the testing position is perpendicular to a camera and a lighting source; the lighting source is a strip light source; and an angle A formed between a direction of light emitted by the strip light source and a direction of light received by the camera is greater than 90° and less than 150°;

3) starting a software control system, a lighting system, a camera system, and a robotic arm motion system to acquire an image of the dark-colored cigarette sample before burning; and igniting the dark-colored cigarette sample, and acquiring, by the camera system, a burning image of the dark-colored cigarette sample in real time;

4) stopping acquiring the burning image of the dark-colored cigarette sample when the dark-colored cigarette sample burns to a distance of 3 mm from a tipping paper;

5) conducting a real-time burning calculation on the dark-colored cigarette sample during the test; and acquiring, by the camera, burning states of a plurality of dark-colored cigarettes at a same burning time; and 6) localizing and identifying an axial edge of the dark-colored cigarette sample in real time during the test; comparing grayscales of pixels with adjacent coordinates at an intersection of a chromatic aberration; acquiring the coordinate information of the burn line and ash column region; and analyzing the burning performance indicator of the dark-colored cigarette sample.

In step (6), the axial edge of the dark-colored cigarette sample is localized and identified by: scanning a highlighted edge of the dark-colored cigarette sample from top to bottom through pixel scanning; when the grayscale of a scanned pixel changes, marking the coordinates of the pixel; and localizing the edge of the dark-colored cigarette sample based on the coordinates.

Preferably, the robotic arm simulates the cigarette smoking process and environment, and the full-vision camera system acquires the image of the burn line. The robotic arm and the method of acquiring the image of the burn line can refer to a series of Chinese patent applications regarding machine vision-based cigarette burning performance. These Chinese patent applications include: a robotic arm for simulate a human cigarette smoking process and environment and a simulation method thereof (2020103139473); a smoking path simulation system based on a robotic arm (2020103234251); a machine vision-based cigarette fly ash detection device and method (2020106880405); and a machine vision-based cigarette fly ash detection device and method by a gray difference method (2020109761732). The devices and methods proposed in these Chinese patent applications are incorporated into the patent application: a method for testing burning performance of a dark-colored cigarette using a dark-colored cigarette paper.

Preferably, in step 1), in order to test the burning performance of different dark-colored cigarettes under a specific condition, pre-treatment is conducted according to a set equilibrium condition, or the different dark-colored cigarettes are directly tested, so as to analyze a difference in an impact of different environmental conditions on the test of the burning performance.

Preferably, in step 3), the camera system includes a plurality of cameras evenly distributed in a direction perpendicular to the dark-colored cigarette sample, ensuring complete image acquisition of a curved surface of an ash column of the dark-colored cigarette sample.

Preferably, in step 3), the lighting system includes a plurality of lighting sources; each of the lighting sources is a strip light source and corresponds to a camera; and each pair of lighting source and camera meets a condition that the angle A formed between the direction of the light emitted by the strip light source and the direction of the light received by the camera is greater than 90° and less than 150°.

Preferably, in step 3), after the dark-colored cigarette sample is ignited, the dark-colored cigarette sample remains in a vertical position without displacement.

Preferably, in step 4), during the test, the camera system automatically acquires the burning image of the dark-colored cigarette sample according to a time interval of 2 seconds; and the time interval is customized according to a testing requirement, with an accuracy of 0.1 seconds.

Preferably, in step 4), during the test, if the dark-colored cigarette sample is not burned to the distance of 3 mm from the tipping paper and is broken prematurely, an image acquisition requirement is not met, and a retest is conducted on a parallel sample.

Preferably, in step 4), image data within different burning lengths or image data within different burning times are acquired.

Compared with the prior art, the present disclosure has the following beneficial effects.

1. In the present disclosure, based on the surface reflection characteristics of the dark-colored cigarette paper and the principle of optical reflection, illumination is provided by the light source at a certain angle from a side to highlight the edge of the dark-colored cigarette sample. Thus, a chromatic aberration is acquired, and the dark-colored cigarette sample is localized, so as to test the burning performance of the dark-colored cigarette sample. Specifically, the lighting source is a strip light source. The direction of light emitted by the strip light source and the direction of light received by the camera is greater than 90° and less than 150°. Through the lighting angle and camera angle, the edge of the dark-colored cigarette sample is precisely illuminated, thereby highlighting the reflected light at the edge of the dark-colored cigarette sample. If the lighting source is not used or if the angle between the direction of the light emitted by the lighting source and the direction of the light received by the camera is not within the range of the angle mentioned above, the edge of the dark-colored cigarette sample cannot be localized on the acquired image.

2. In the present disclosure, the camera system includes a plurality of industrial cameras. Through exposure control on the industrial cameras, the industrial cameras can distinguish the highlighted edge of the dark-colored cigarette from a background of a dark field during image processing, so as to acquire an edge peak of a chromatic aberration. A scanning line of a detection algorithm is employed to capture the edge peak, so as to track and localize the dark-colored cigarette in a field of view in real time, thereby tracking and localizing the burn line of the dark-colored cigarette in real time. Specifically, the chromatic aberration between the unburned dark-colored cigarette paper and the ash column of the burned dark-colored cigarette sample is identified by: scanning a highlighted edge of the dark-colored cigarette sample from top to bottom through pixel scanning; when the grayscale of a scanned pixel changes, marking the coordinates of the pixel; and localizing the edge of the dark-colored cigarette sample based on the coordinates.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 7A-7J show test images of cigarette samples shown in Table 1-1.

FIGS. 8A-8J show test images of cigarette samples shown in Table 1-2.

FIGS. 9A-9J show test images of cigarette samples shown in Table 2-1.

FIGS. 10A-10J show test images of cigarette samples shown in Table 2-2.

FIGS. 12A-12J show test images of cigarette samples shown in Table 3-2.

DETAILED DESCRIPTION OF THE EMBODIMENTS

Figure 1:
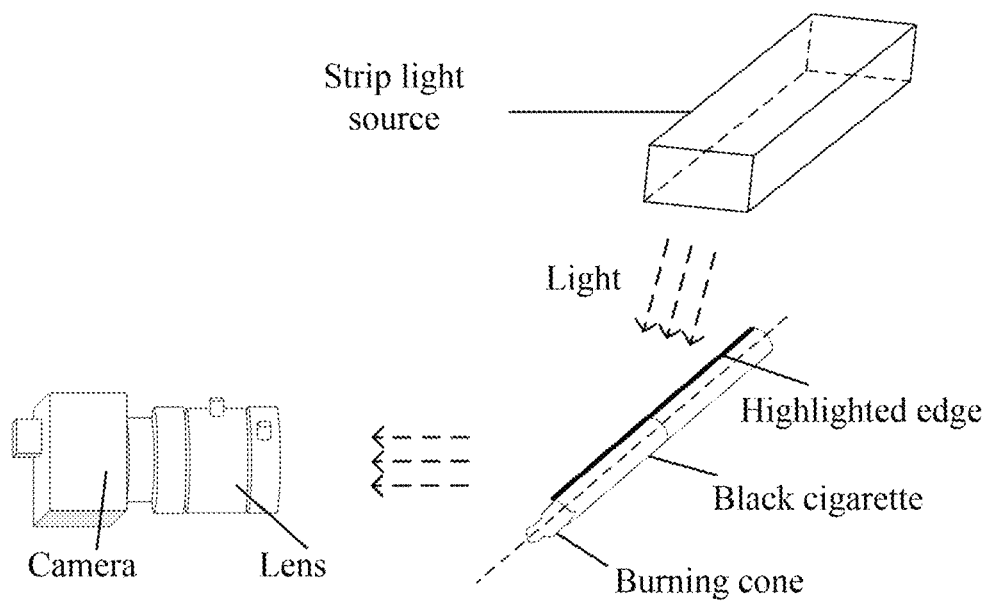
FIG. 1 shows positions of a lighting source, a camera, and a cigarette.

The following will explain the present disclosure based on specific embodiments, but the implementations of the present disclosure are not limited herein. In the embodiments, the test method without specified conditions usually follows conventional conditions and the conditions in the manual. Unless otherwise specified, the general devices, materials, reagents, etc. recommended by the manufacturer can be acquired through commercial channels. The raw materials used in the following embodiments and comparative examples are commercially available raw materials.

Embodiment 1

In this embodiment, taking a black cigarette sample with a circumference of 22.0 mm (using a cigarette paper with a grayscale of 79.08, shown in FIG. 6) as an example, the method of the present disclosure is used to test the crack rate and the grayscale of the ash column during the burning process of the black cigarette sample.

The method includes the following steps.

1) Pre-treatment is conducted on a dark-colored cigarette sample in accordance with GB/T 16447 standard before a test begins.

2) The dark-colored cigarette sample is put at a testing position, where an axial direction of the dark-colored cigarette sample at the testing position is perpendicular to a camera and a lighting source; the lighting source is a strip light source; and an angle A formed between a direction of light emitted by the strip light source and a direction of light received by the camera is greater than 90° and less than 150°.

3) A software control system, a lighting system, a camera system, and a robotic arm motion system are started to acquire an image of the dark-colored cigarette sample before burning. The dark-colored cigarette sample is ignited, and a burning image of the dark-colored cigarette sample is acquired by the camera system in real time.

4) The acquisition of the burning image of the dark-colored cigarette sample is stopped when the dark-colored cigarette sample burns to a distance of 3 mm from a tipping paper.

5) A real-time burning calculation is conducted on the dark-colored cigarette sample during the test, and burning states of a plurality of dark-colored cigarettes at a same burning time are acquired by the camera.

6) An axial edge of the dark-colored cigarette sample is localized and identified in real time during the test. Grayscales of pixels with adjacent coordinates at an intersection of a chromatic aberration are compared. The coordinate information of the burn line and ash column region are acquired, and the burning performance indicator of the dark-colored cigarette sample is analyzed.

In step (6), the axial edge of the dark-colored cigarette sample is localized and identified by: scanning a highlighted edge of the dark-colored cigarette sample from top to bottom through pixel scanning; when the grayscale of a scanned pixel changes, marking the coordinates of the pixel; and localizing the edge of the dark-colored cigarette sample based on the coordinates.

Specifically, the system controls the light source to illuminate the camera's field of view, and the camera captures images. When the angle between the direction of the light emitted by the strip light source and the direction of the light received by the camera lens is greater than 90° and less than 150°, the axial edge of the black cigarette sample reflects more light. The remaining curved part of the black cigarette sample reflect the surface reflected light into a space not accessible for the camera's field of view, with only some weak scattered light entering the camera's field of view.

Figure 2:
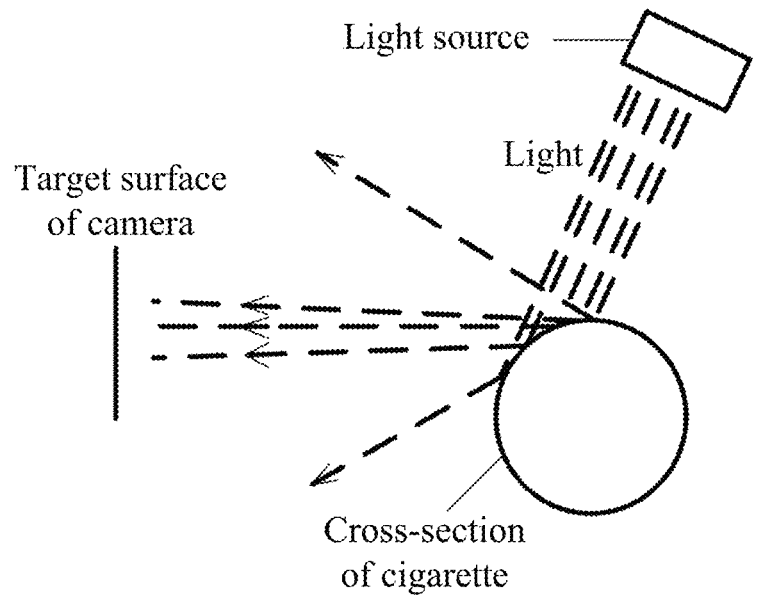
FIG. 2 shows a cigarette testing angle formed between a direction of light emitted by the lighting source and a direction of light received by the camera.

However, compared to the concentrated bright light at the edge, the weak scattered light can be ignored by controlling the lens aperture and exposure parameters of the camera. Specifically, the incident light is shown in FIG. 2.

Figure 3:
FIG. 3 shows an image of a burning black cigarette.
Figure 4:
FIG. 4 shows an identification result of an edge of the black cigarette.

In step 6), during image processing, the black cigarette sample is first localized. By using the above lighting method, after the image is grayed into a grayscale image, the highlighted part at the edge of the black cigarette sample produces a significant chromatic aberration from the environmental background, as shown in FIG. 3. The software recognition result is marked with a green line, as shown in FIG. 4.

Figure 5:
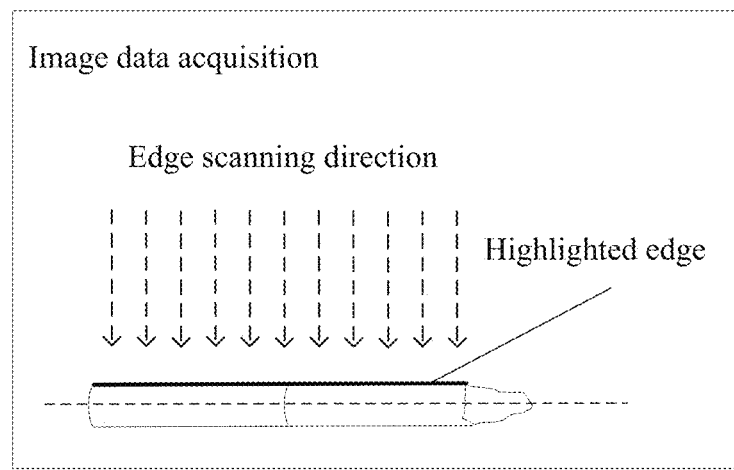
FIG. 5 shows scanning and localization of the edge of the black cigarette.

Based on the chromatic aberration, the black cigarette sample is localized. Specifically, based on a region of interest (ROI) in the image, the highlighted edge of the black cigarette sample is scanned from top to bottom through pixel scanning, as shown in FIG. 5. When the grayscale of a scanned pixel changes, the coordinates of the pixel are marked. Based on the coordinates, the edge of the black cigarette sample is localized. Subsequently, various quality indicators of the black cigarette sample are detected and quantified using a same image processing algorithm as a conventional cigarette.

The tested crack rate and grayscale of the black cigarette sample are as follows:

Table 1-1 shows the tested crack rate of the black cigarette sample. A larger crack rate indicates a larger crack area of the ash column. The tested value is consistent with the actual observed value with the naked eye.

TABLE 1-1

Black cigarette sample (circumference 22.0 mm) data table - Crack rate

Serial numbers (SN) & values of cigarettes (Unit: %)

| SN | 1 | 2 | 3 | 4 | 5 |
|---|---|---|---|---|---|
| Test image | FIG. 7A | FIG. 7B | FIG. 7C | FIG. 7D | FIG. 7E |
| Tested value | 4.93 | 5.54 | 6.86 | 7.82 | 9.30 |
| SN | 6 | 7 | 8 | 9 | 10 |
| Test image | FIG. 7F | FIG. 7G | FIG. 7H | FIG. 7I | FIG. 7J |
| Tested value | 10.12 | 11.63 | 13.45 | 15.36 | 20.91 |

Table 1-2 shows the tested grayscale of the black cigarette sample. A larger grayscale indicates a whiter cigarette. However, during the test, due to the influence of sparks from the burning cone, when the cigarette is smoked, the sparks light and the overall whiteness of the cigarette is improved. Therefore, in order to ensure more accurate characterization of the grayness, it is recommended to remove the sparks part of the burning cone from the acquired analysis image. The tested value of the grayscale of the black cigarette paper is consistent with the actual observed value with the naked eye.

TABLE 1-2

Black cigarette sample (circumference 22.0 mm) data table - Grayscale

Serial numbers (SN) & tested values of cigarettes (unit: %)

| SN | 1 | 2 | 3 | 4 | 5 |
|---|---|---|---|---|---|
| Test image | FIG. 8A | FIG. 8B | FIG. 8C | FIG. 8D | FIG. 8E |
| Tested value | 101.99 | 111.55 | 115.9231 | 121.3239 | 122.97 |
| SN | 6 | 7 | 8 | 9 | 10 |
| Test image | FIG. 8F | FIG. 8G | FIG. 8H | FIG. 8I | FIG. 8J |
| Tested value | 126.54 | 130.89 | 131.03 | 134.70 | 138.16 |

Embodiment 2

Figure 6:
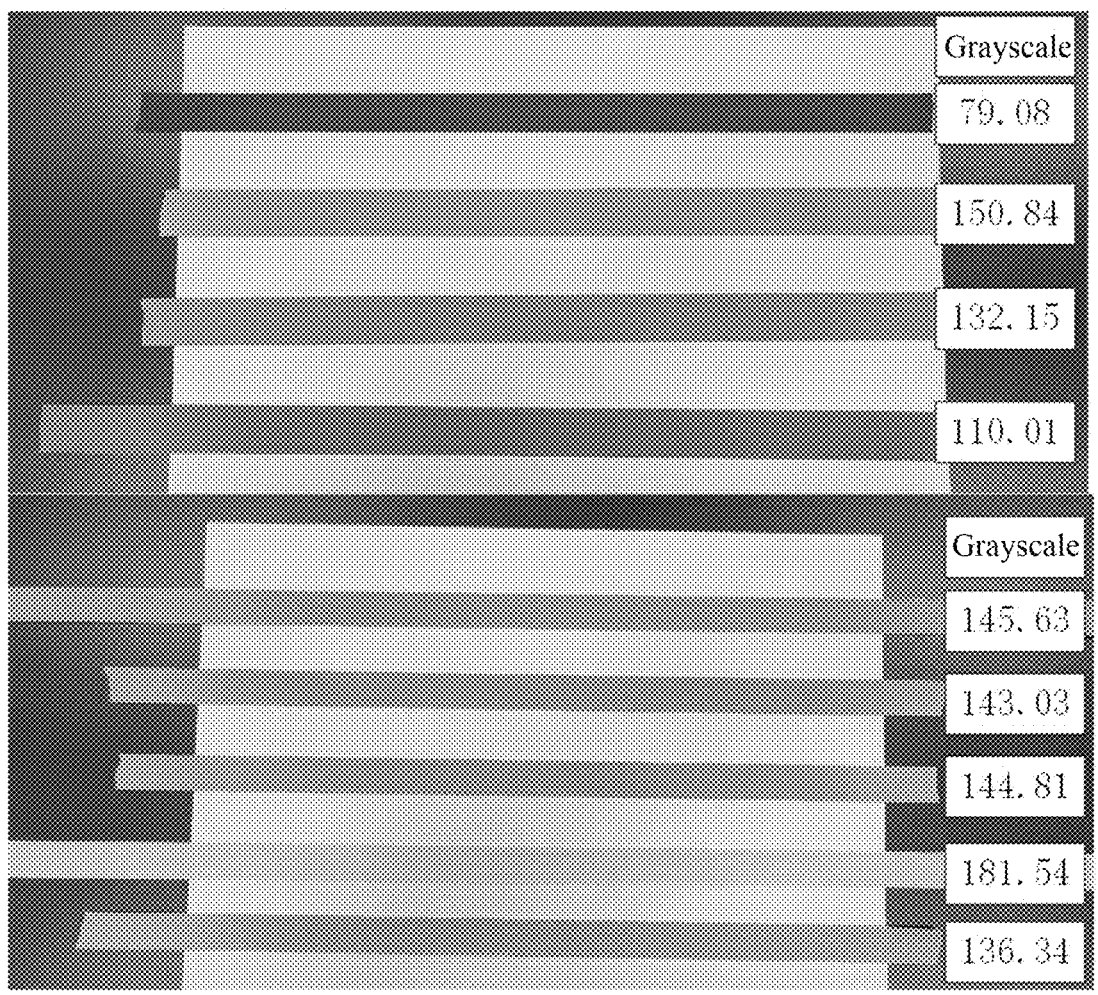
FIG. 6 shows grayscales of commonly used black, dark brown, light brown, and multi-colored cigarette papers.

In this embodiment, taking a brown cigarette sample with a circumference of 22.0 mm (using a cigarette paper with a grayscale of 150.84, shown in FIG. 6) as an example, the method of the present disclosure is used to test the crack rate and the grayscale of the ash column during the burning process of the black cigarette sample. The test method is the same as that in Embodiment 1.

The tested crack rate and grayscale of the brown cigarette sample (with a circumference of 22.0 mm) are as follows:

Table 2-1 shows the tested crack rate of the brown cigarette sample. A larger crack rate indicates a larger crack area of the ash column. The tested value is consistent with the actual observed value with the naked eye.

TABLE 2-1

Brown cigarette sample (circumference 22.0 mm) data table - Crack rate

Serial numbers (SN) & tested values of cigarettes (unit: %)

| SN | 1 | 2 | 3 | 4 | 5 |
|---|---|---|---|---|---|
| Test image | FIG. 9A | FIG. 9B | FIG. 9C | FIG. 9D | FIG. 9E |
| Tested value | 5.91 | 7.03 | 9.73 | 11.02 | 11.88 |
| SN | 6 | 7 | 8 | 9 | 10 |
| Test image | FIG. 9F | FIG. 9G | FIG. 9H | FIG. 9I | FIG. 9J |
| Tested value | 12.26 | 16.17 | 16.97 | 25.19 | 27.04 |

Table 2-2 shows the tested grayscale of the brown cigarette sample. A larger grayscale indicates a whiter cigarette. The tested value of the grayscale of the brown cigarette paper is consistent with the actual observed value with the naked eye.

TABLE 2-2

Brown cigarette sample (circumference 22.0 mm) data table - Grayscale

Serial numbers (SN) & tested values of cigarettes

| SN | 1 | 2 | 3 | 4 | 5 |
|---|---|---|---|---|---|
| Test image | FIG. 10A | FIG. 10B | FIG. 10C | FIG. 10D | FIG. 10E |
| Tested value | 108.44 | 113.46 | 114.13 | 122.99 | 125.20 |
| SN | 6 | 7 | 8 | 9 | 10 |
| Test image | FIG. 10F | FIG. 10G | FIG. 10H | FIG. 10I | FIG. 10J |
| Tested value | 128.54 | 131.41 | 133.43 | 136.24 | 141.47 |

Embodiment 3

In this embodiment, taking a brown cigarette sample with a circumference of 24.5 mm (using a cigarette paper with a grayscale of 110.01, shown in FIG. 6) as an example, the method of the present disclosure is used to test the crack rate and the grayscale of the ash column during the burning process of the black cigarette sample. The test method is the same as that in Embodiment 1.

The tested crack rate and grayscale of the brown cigarette sample (with a circumference of 24.5 mm) are as follows:

Table 3-1 shows the tested crack rate of the brown cigarette sample. A larger crack rate indicates a larger crack area of the ash column. The tested value is consistent with the actual observed value with the naked eye.

TABLE 3-1

Brown cigarette sample (circumference 24.5 mm) data table - Crack rate

Serial numbers (SN) & tested values of cigarettes

Figure 11A:
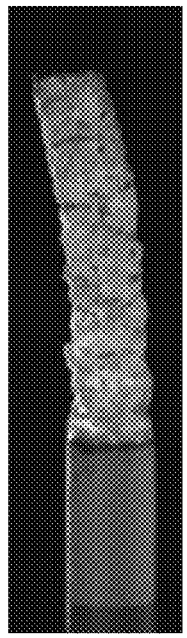
FIGS. 11A-11J show test images of cigarette samples shown in Table 3-1.
Figure 11B:
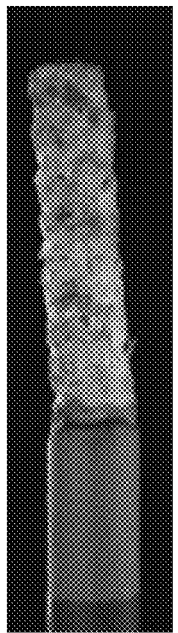
Figure 11C:
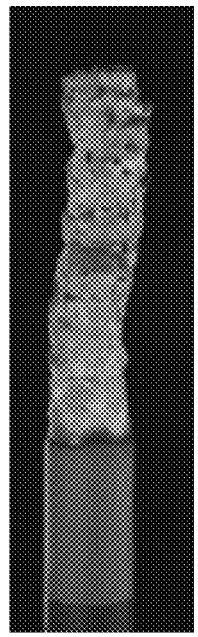
Figure 11D:
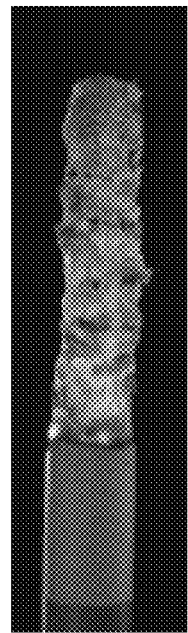
Figure 11E:
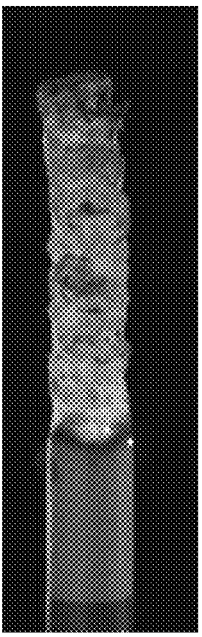
Figure 11F:
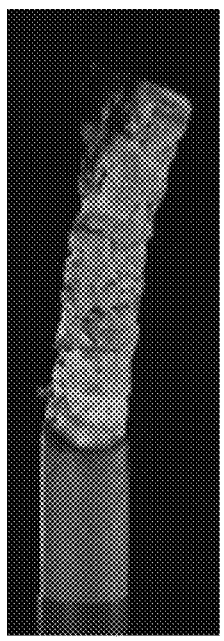
Figure 11G:
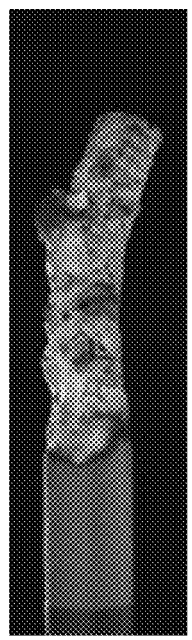
Figure 11H:
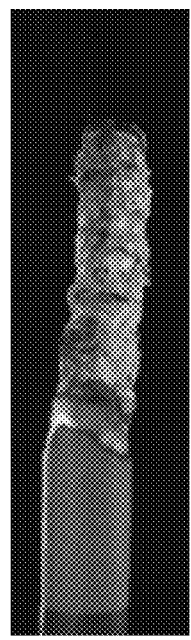
Figure 11I:
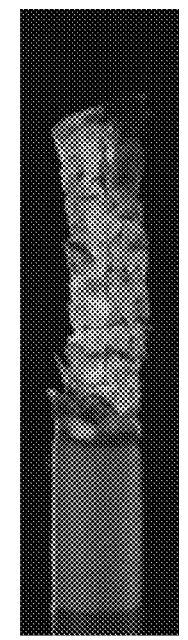
Figure 11J:
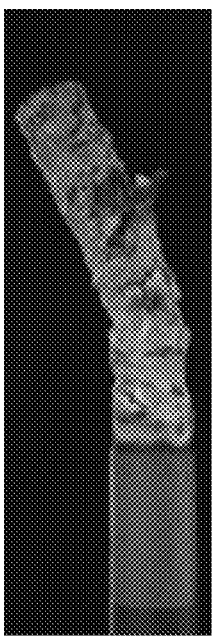

| SN | 1 | 2 | 3 | 4 | 5 |
|---|---|---|---|---|---|
| Test image | FIG. 11A | FIG. 11B | FIG. 11C | FIG. 11D | FIG. 11E |
| Tested value | 3.69 | 5.06 | 7.51 | 9.39 | 12.09 |
| SN | 6 | 7 | 8 | 9 | 10 |
| Test image | FIG. 11F | FIG. 11G | FIG. 11H | FIG. 11I | FIG. 11J |
| Tested value | 14.33 | 16.12 | 17.66 | 18.74 | 19.55 |

Table 3-2 shows the tested grayscale of the brown cigarette sample. A larger grayscale indicates a whiter cigarette. The tested value of the grayscale of the brown cigarette paper is consistent with the actual observed value with the naked eye.

TABLE 3-2

Brown cigarette sample (circumference 24.5 mm) data table - Grayscale

Serial numbers (SN) & tested values of cigarettes

| SN | 1 | 2 | 3 | 4 | 5 |
|---|---|---|---|---|---|
| Test image | FIG. 12A | FIG. 12B | FIG. 12C | FIG. 12D | FIG. 12E |
| Tested value | 109.43 | 112.13 | 116.69 | 119.31 | 123.69 |
| SN | 6 | 7 | 8 | 9 | 10 |
| Test image | FIG. 12F | FIG. 12G | FIG. 12H | FIG. 12I | FIG. 12J |
| Tested value | 126.49 | 129.13 | 131.87 | 133.23 | 137.72 |

What is claimed is:

1. A method for testing burning performance of a dark-colored cigarette using a dark-colored cigarette paper, wherein the dark-colored cigarette paper has a grayscale less than 255, and the method comprises: simulating, by a robotic arm, a cigarette smoking process and environment; acquiring, by a full-vision camera system, an image of a burn line and ash column region of the dark-colored cigarette; and analyzing a burning performance indicator of the dark-colored cigarette according to coordinate information of the burn line and ash column region;

wherein the method comprises the following steps:
1) Conducting pre-treatment on a dark-colored cigarette sample in accordance with GB/T 16447 standard before a test begins;
2) Putting the dark-colored cigarette sample at a testing position, wherein an axial direction of the dark-colored cigarette sample at the testing position is perpendicular to a camera and a lighting source; the lighting source is a strip light source; and an angle A formed between a direction of light emitted by the strip light source and a direction of light received by the camera is greater than 90° and less than 150°;
3) Starting a software control system, a lighting system, a camera system, and a robotic arm motion system to acquire an image of the dark-colored cigarette sample before burning; and igniting the dark-colored cigarette sample, and acquiring, by the camera system, a burning image of the dark-colored cigarette sample in real time;
4) Stopping acquiring the burning image of the dark-colored cigarette sample when the dark-colored cigarette sample burns to a distance of 3 mm from a tipping paper;
5) Conducting a real-time burning calculation on the dark-colored cigarette sample during the test; and acquiring, by the camera, burning states of a plurality of dark-colored cigarettes at a same burning time; and
6) Localizing and identifying an axial edge of the dark-colored cigarette sample in real time during the test; comparing grayscales of pixels with adjacent coordinates at an intersection of a chromatic aberration; acquiring the coordinate information of the burn line and ash column region; and analyzing the burning performance indicator of the dark-colored cigarette sample;

wherein, in step (6), the axial edge of the dark-colored cigarette sample is localized and identified by: scanning a highlighted edge of the dark-colored cigarette sample from top to bottom through pixel scanning; when the grayscale of a scanned pixel changes, marking the coordinates of the pixel; and localizing the edge of the dark-colored cigarette sample based on the coordinates.

2. The method according to claim 1, wherein in step 1), in order to test the burning performance of different dark-colored cigarettes under a specific condition, pre-treatment is conducted according to a set equilibrium condition, or the different dark-colored cigarettes are directly tested, so as to analyze a difference in an impact of different environmental conditions on the test of the burning performance.

3. The method according to claim 1, wherein in step 3), the camera system comprises a plurality of cameras evenly distributed in a direction perpendicular to the dark-colored cigarette sample, ensuring complete image acquisition of a curved surface of an ash column of the dark-colored cigarette sample.

4. The method according to claim 3, wherein in step 3), the lighting system comprises a plurality of lighting sources; each of the lighting sources is a strip light source and corresponds to a camera; and each pair of lighting source and camera meets a condition that the angle A formed between the direction of the light emitted by the strip light source and the direction of the light received by the camera is greater than 90° and less than 150°.

5. The method according to claim 1, wherein in step 3), after the dark-colored cigarette sample is ignited, the dark-colored cigarette sample remains in a vertical position without displacement.

6. The method according to claim 1, wherein in step 4), during the test, the camera system automatically acquires the burning image of the dark-colored cigarette sample according to a time interval of 2 seconds; and the time interval is customized according to a testing requirement, with an accuracy of 0.1 seconds.

7. The method according to claim 1, wherein in step 4), during the test, if the dark-colored cigarette sample is not burned to the distance of 3 mm from the tipping paper and is broken prematurely, an image acquisition requirement is not met, and a retest is conducted on a parallel sample.

8. The method according to claim 1, wherein in step 4), image data within different burning lengths or image data within different burning times are acquired.

\* \* \* \* \*